United States Patent Office 3,432,664
Patented Mar. 11, 1969

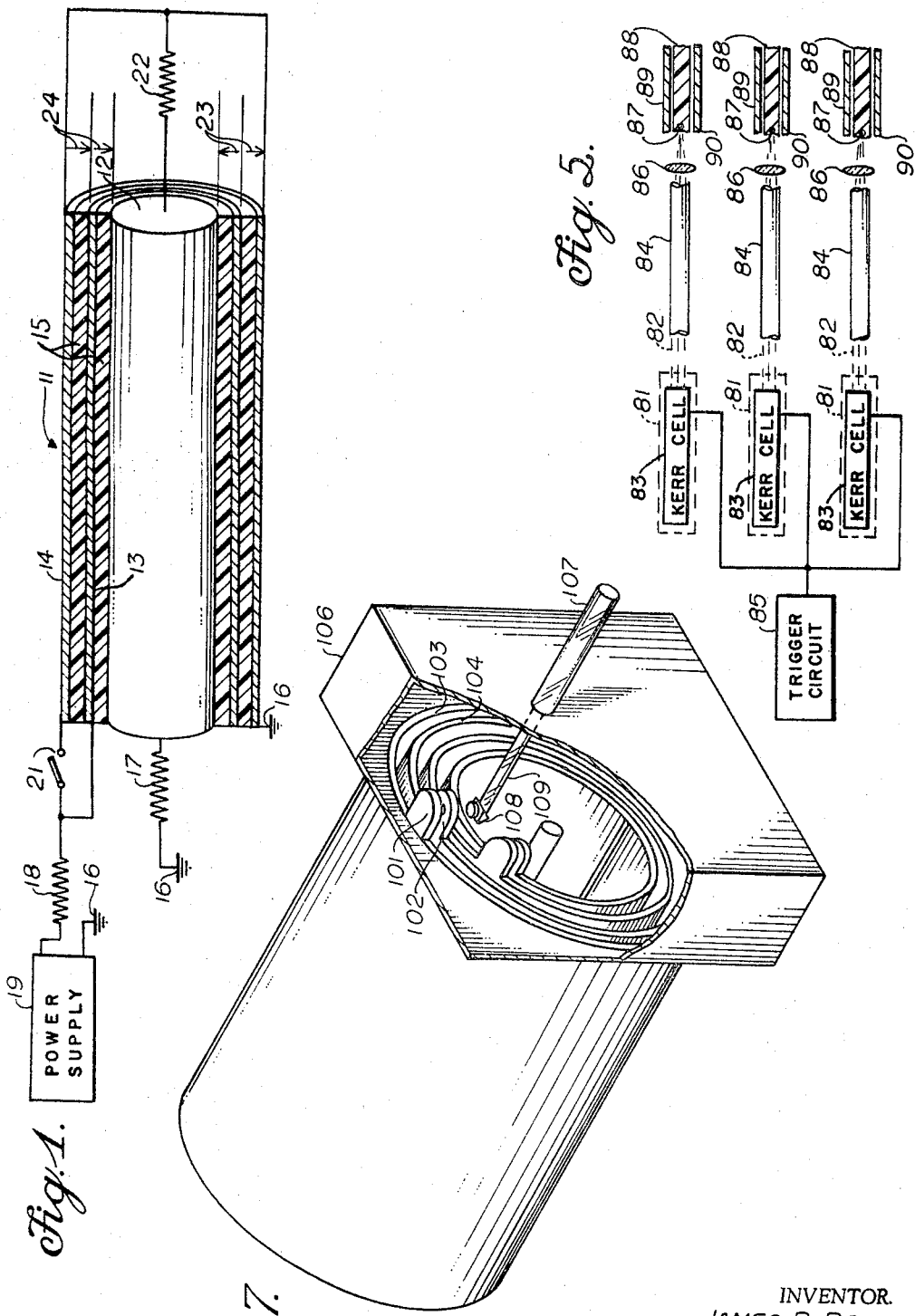

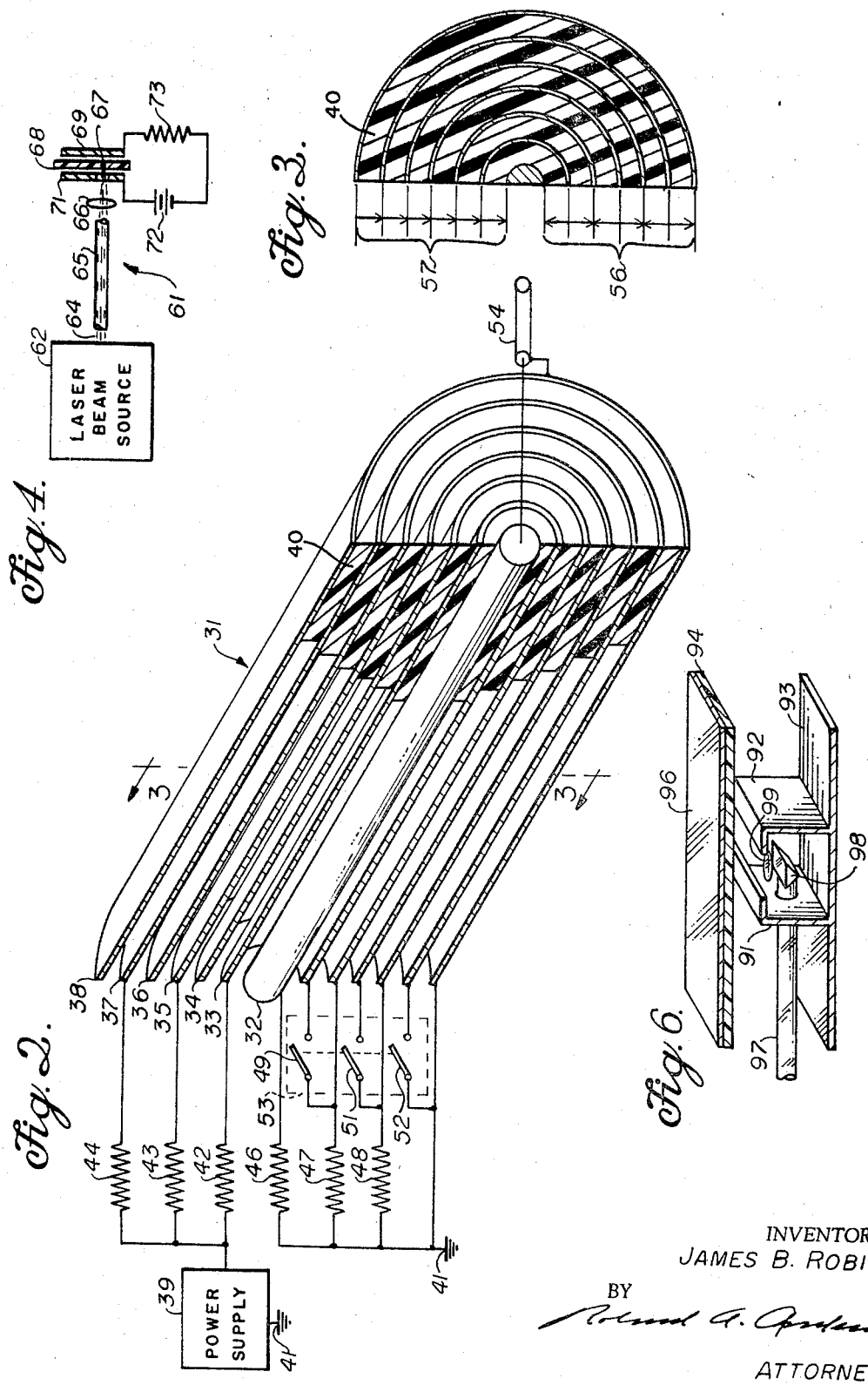

3,432,664
HIGH VOLTAGE FIELD-REVERSAL PULSE GENERATOR USING A LASER SWITCHING MEANS TO ACTIVATE A FIELD EMISSION X-RAY TUBE
James Berkeley Robison, Livermore, Calif., assignor to the United States of America as represented by the United States Atomic Energy Commission
Filed Nov. 10, 1964, Ser. No. 410,328
U.S. Cl. 250—98
Int. Cl. H05g 1/24
8 Claims

ABSTRACT OF THE DISCLOSURE

A fast high voltage, high current pulse generator wherein high voltage on a first insulated elongated conductor disposed between second and third similar concentric conductors is switched to an end of the second conductor, providing an electric field reversal and generation of a high voltage, high current pulse at the ends of said second and third conductors.

---

This invention relates to pulse generators and more particularly it relates to a transmission-line-type pulse generator which adapted with a unique laser beam switch is able to generate fast rise time short duration pulses at extremely high voltages and peak power levels.

Low output-impedance pulse generators (e.g., 100 ohms) operating in the million volt region are rarities. Those high voltage generators that do exist are generally very bulky and complex in structure. In general, most of the million volt generators have a high output impedance, a low power output and a slow rise time characteristic. This slow rise time characteristic, which generally lies in the microsecond region, prevents the generation of short pulses approaching a one nanosecond duration. This slow rise time characteristic usually is caused by two major factors. First, pulse generators present complex transmission line impedance matching problems. Unless solved, these impedance matching problems result in the degradation of the rise time characteristic of the output pulse from the generator. Secondly, switching means capable of operating in the million volt region generally have intolerably high inductances and slow closure times (e.g., $10^{-6}$ henries; 50 nanosecond).

Typical prior art devices for producing high voltages are the Cable Marx voltage multiplier circuit and the Blumlein pulser. The Cable Marx circuit, in which voltage multiplication is obtained by charging a plurality of coaxial transmission lines in parallel and discharging them in series, has an inherently high internal inductance, e.g., $10^{-6}$ henries, that limits the generation of fast rise time, high energy, high voltage pulses. In the Blumlein pulser, inherent structural features expose high voltage conductor regions to the external environment which creates personnel safety hazards and requires bulky insulation structures.

The present invention provides a field-reversal pulse generator which in its most highly developed and remarkably effective form, utilizes a unique laser beam switch, which eliminates the above-mentioned deficiencies of prior art high voltage pulse generators. In the device of this invention, mutually insulated conducting members are sandwiched proximate each other in such a manner that each insulation defines high voltage insulation and dielectric regions. By reference, the members are fabricated in the form of coaxially arranged cylinders. On successive alternate members there is imposed a high voltage of similar polarity relative to their respective adjacent members. In its preferred embodiment, a laser beam switch of special construction is employed to initiate events which result in the generation of the output pulse. Such switch is preferably constructed with contact poles disposed at a first end of the generator integrally in end dielectric regions between adjacent generator members and with a laser beam source arranged to direct a laser beam to impinge the dielectric in alternate insulation regions and between the contact poles. The laser beam breaks down the dielectric in the alternate insulation regions at the first "switching" end of the generator to effectively short, i.e., electrically connect, the members astride the alternate insulation regions to generate the desired high voltage output pulse. It can be seen that each of the above-mentioned insulation regions together with its two adjacent members define an open ended coaxial transmission line.

With the foregoing arrangement, prior to shorting the members, the high voltages initially imposed on alternate members, effectively cancel each other. Now the previously explained shorting of the members initiates a voltage removing step function wave which travels from the first "switching" end towards the second end of the transmission line. It is a well known phenomena that an electric wave travelling along a transmission line is reflected without inversion upon encountering an open circuit. When this voltage removing wave reaches the second end of the generator, it momentarily encounters an open circuit and is reflected without being inverted. The electric field initially imposed across alternate insulation regions is then reversed such that the fields no longer cancel. The name "field-reversal pulse generator" is derived from this event. At this point in time, since the electric fields between adjacent members no longer cancel each other, current will flow in the load impedance. The voltage developed across this load impedance will be the sum of the voltages impressed between the adjacent members. This follows since the voltages initially imposed across alternate insulation regions have been inverted and instead of the voltages cancelling, they now additively combine.

At this point it is important to consider that maximum utilization of the high voltage, high power, fast rise-time capabilities of the field-reversal pulse generator of the present invention requires the use of fast response, low inductance switches having highly synchronized poles. For example, to generate a two million volt pulse at 100 billion watts having a rise time of 4 nanoseconds, the switch should have an inductance equal to or less than $10^{-8}$ henries, a response time less than 2 nanoseconds, and where a multiple pole switch is employed a pole synchronization time of aboue one nanosecond. These stringent requirements, which far exceed the capabilities of prior art switches easily are satisfied with the laser beam switch of the invention.

Accordingly, it is an object of the present invention to provide a compact, high voltage, high power, pulse generator capable of generating pulses with a nanosecond rise-time.

Further, it is an object of this invention to provide a low-output-impedance, high-power, high-voltage pulse generator.

A still further object of this invention is to provide a low output impedance pulse generator capable of producing, e.g., a 2 million volt, $10^{11}$ watt pulse.

Another object of the present invention is to provide a short-duration fast-rise-time high-voltage pulse generator.

A more specific object of this invention is to provide a pulse generator which can generate 30 nanosecond duration, 4 nanosecond rise-time, million-volt pulses.

A still further object of this invention is to provide a pulse generator which easily is matched with a transmission line type load.

More particularly, an object of the invention is to provide a pulse generator constructed in the nature of a coaxial transmission line which is readily coupled and matched to a coaxial transmission line load, without the necessity of an intermediate switch.

Yet another object is to provide a fast-closure-time high-voltage switch capable of a one nanosecond closure time.

It is yet another object of the invention to provide a highly-synchronized multiple-pole extremely-low-inductance high-voltage switch.

Still another object of this invention is to provide a multipole switch wherein each pole can withstand 100,000 volts, wherein the inductance of each pole is as low as $10^{-10}$ henries, and wherein the various poles synchronously close within a time spread as small as $10^{-9}$ seconds.

These and other objects and advantages of the present invention will become more apparent upon consideration of the following description taken in conjunction with the accompanying drawings in which:

FIGURE 1 is a diagram of a single-stage field-reversal pulse generator in accordance with the invention;

FIGURE 2 diagrams a multistage field-reversal pulse-generator;

FIGURE 3 is a partial end view of the structure shown in FIG. 2 illustrating the field-reversal effect;

FIGURE 4 schematically depicts the basic laser beam operated switch;

FIGURE 5 illustrates a multiple pole laser beam switch having highly synchronous poles;

FIGURE 6 is an illustration of one embodiment of the switch employing a solid-type of dielectric material; and FIGURE 7 illustrates an alternate configuration of the laser beam switch adapted to be used in the field-reversal pulse generator wherein an oil dielectric is employed to electrically isolate the switch contacts.

A simplified and basic embodiment of the generator of the invention is illustrated in FIGURE 1 wherein pulse generator 11 is comprised of an elongated conducting cylinder 12, a first conducting cylindrical shell 13 coaxially supported in nested spaced relation to cylinder 12. A second conducting cylindrical shell 14 is coaxially spaced and supported in coextensive nested relation with shell 13. The cylinders are supported in their relative spaced relationship by conventional insulation means 15. A first end of shell 14 is connected to ground 16. The corresponding end of cylinder 12 connects through high impedance means 17, e.g., a resistor, to ground 16. It has been determined that 100,000 ohm resistor will work quite well. Shell 13 connects through high impedance means 18 to high voltage souce 19, e.g., 100,000 volts power supply, referenced to ground 16. A normally-open switch 21, preferably of the shorting type described more fully hereinafter, is provided between the first end of shell 14 and the adjacent first end of shell 13. A load 22, depicted schematically as a resistive impedance is connected between the second end of shell 14 and the corresponding end of cylinder 12. In practice this load may be, for example, an X-ray tube having a needle-point field-emission cathode adapted to be connected directly to the inner conductor of the pulse generator 11, and having its anode adapted to be connected directly to the outer conductor of generator 11. With such a load, shell 13 is referenced positively with respect to ground 16.

In operation, with switch 21 open, high voltage source 19, which is referenced to ground 16, imposes a voltage through resistor 18 on shell 13. This voltage establishes two electrostatic fields; one field between shell 13 and shell 14, which is referenced to ground 16, and another field between shell 13 and cylinder 12 which also is referenced to ground 16 through resistor 17. These fields represent energy stored in the distributed capacity of the system. With reference to load 22, these two electrostatic fields cancel since they are equal and opposite in direction, as is depicted by field vector lines 23. Hence, no current flows in load 22 when switch 21 is open.

When switch 21 is closed, thereby electrically connecting the first ends of shells 13 and 14, a voltage removing pulse starts travelling from the switch end of the generator towards load 22 along the transmission line combination formed by shells 13 and 14. When this pulse reaches the load end of the generator, it momentarily encounters an open circuit and a polarity reversal of the electrostatic field occurs, such that from the standpoint of load 22, the two electrostatic fields are additive. This field reversal establishes a potential difference across load 22 and hence current flows in the load. Field vactor lines 24 depict this additive feature. The impedance of load 22 preferably is selected to equal the characteristic impedance of the transmission line formed by the coaxial conductor shell 14 and cylinder 12, in order that there will appear across load 22 a single square wave pulse whose duration is equal to twice the transit time of the voltage removing pulse along said transmission line.

The formation of this resultant double transit time pulse can be explained as follows. As noted hereinbefore, when switch 21 is closed a voltage removing step function wave is formed between shells 13 and 14 and upon encountering the open end of the line distal switch 21, this wave is reflected without inversion thereby reversing the electric field established between shells 13 and 14. The resulting potential difference across load 22 causes current to flow in load 22. At the instant current begins to flow in load 22, first and second step function pulses begin to propagate away from the load towards the switch end of the pulse generator, the first pulse travelling along the first transmission line formed by shell 13 and shell 14, and the second pulse travelling along the second transmission line formed by cylinder 12 and shell 13. When this first pulse reaches the closed circuit at switch 21, it is inverted and reflected towards load 22. The second pulse encounters a substantially open circuit at the switch end of generator 11 and hence it is reflected but not inverted. There are now two equal but opposite voltage step function pulses travelling towards load 22. When these two pulses simultaneously reach load 22 they encounter, not an open circuit, but a matched load. Hence, the voltage pulses cancel each other thereby resulting in no further output voltage appearing across load 22. Therefore, the length of the aforesaid transmission line sections determines the duration of the pulse applied across the load 22. Note that this impedance matching is not necessary in order to obtain a field reversal voltage doubling effect but is only necessary to obtain a single square pulse. For a more complete analytical treatment of travelling waves and generated waveforms, relevant to the above, see H. H. Skilling, "Electric Transmission Lines," pp. 390–413, McGraw-Hill, 1951. It should be noted that high impedance means 17 and 18 merely serve as isolation devices when switch 21 is closed. Hence, the resistors mentioned supra as high impedance means 17 and 18 could be supplanted by diodes, inductors, switch contacts or other pulse isolating means.

With the simplified pulse generator depicted in FIGURE 1 the maximum voltage output is limited to twice the voltage of power source 19. However, with a more complex arrangement of a multiplicity of coaxial shell pairs and associated shorting switches, any desired voltage level can be obtained. The multiplicity of coaxial shell pairs can be constructed simply by winding alternately successive layers of metal foil and dielectric sheets. FIGURE 2 depicts such a multiple-stage, field-reversal pulse generator 31 employing, for illustrative purposes, three stages; however, no practical limit is known to the number of stages. In practice, as many as twenty stages may be connected to a 100,000 volt power source to provide a 2 million volt output pulse. This 100,000 volt value is an illustrative selection, and higher and lower voltages as well as more or less stages can be employed. In FIGURE 2, field reversal pulse generator 31 is comprised of a central elongated conducting cylinder 32 coaxially surrounded by six progressively larger diameter conducting shells 33, 34, 35, 36, 37, and 38, respectively. Each of the shells is electrically insulated from the other shells and cylinder 32, preferably by means of sheet dielectric 40 as illustrated. High voltage source 39, which is referenced to ground point 41, connects through high impendance resistor 42 to shell 33, through high impedance resistor 43 to shell 35, and through high impedance rsistor 44 to shell 37, respectively. Ground point 41 is connected through high impedance resistor 46 to cylinder 32, through high impedance resistor 47 to shell 34, through high impedance resistor 48 to shell 36 and connects directly to shell 38, respectively. To provide switching means effective to produce the desired voltage, there is employed three pairs of insulation-isolated normally-open poles 49, 51, and 52 defining a shorting switch 53. These switch poles are connected, respectively, across adjacent first ends of adjacent shells 33 and 34, shells 35 and 36, and shells 37 and 38. The shorting switch 53 is preferably of the laser beam actuated type constructed integrally therewith as disclosed more fully hereinafter. Load 54, shown schematically, may include a coaxial transmission line connected between the second end of inner cylinder 32 and the adjacent second end of outermost shell 38 to deliver the output pulse to the point of use, e.g., a flash X-ray tube.

In the initial stages of operation, high voltage source 39 establishes three paired quiesent electrostatic fields which together algebraicly cancel with reference to load 54 and hence no current flows in load 54. Field vector lines 56 of FIGURE 3 are used to illustrate this point. Simultaneous closure of switch poles 49, 51, and 52 sends three simultaneous voltage-removing travelling-wave stepfunction pulses along the transmission line combinations of shells 33 and 34, shells 35 and 36, and shells 37 and 38, respectively, towards the load end of generator 31. As was the case with the device shown in FIGURE 1, when these pulses reach the load end of the generator, a field reversal occurs, and from the standpoint of load 54, the six electrostatic fields are arithmetically added, and current will then flow in load 54. As was the case with the structure recited in FIGURE 1, a matched load will be subjected to a square voltage pluse whose duration is twice the transmission line transit-time of the shell 38—cylinder 32 transmission line combination. Field vector line 57 of FIGURE 3 depict this field reversal effect.

The coaxial structure of the preferred embodiment of the present invention lends itself well to a compact, low characteristic impedance structure which readily is coupled to and impedance matched with coaxial leads. This coupling and matching is made easier still by that fact that the switching means is located other than between the pulse generator output terminals and the load. Insulation and high voltage safetly problems are minimized by the coaxial structure of this pulse genrator. In particular, a simple grounding of the outermost conducting cylinder, which encloses all high voltage elements, eliminates the need for bulky, expensive insulation normally required by exceedingly high voltage pulse generators.

To utilize he field reversal pulse generator most effectively, the switching means must meet some rather stringent switching requirements. For example, with a 3 nanosecond pulse, the pole conacts must all close within a time spread of less than 2 nanoseconds. Secondly, the inductance of each pole of the switch must be less than $10^{-8}$ henries. The best heretofore available switch whose poles can be simultaneously triggered has a minimum inductance in the nighborhood of $10^{-6}$ henries. This is the pressurized arc ball gap switch. Thirdly, the breakdown voltage betwen separate poles of the switch must exceed the applied stage voltage, which, for minimum size implies that the switch poles must be insulated by means of an effective dielectric from each other.

The invention provides a switching means in which a laser beam is employed to initiate breakdown of dielectric disposed between contact poles and thereby actuate the switching function between switch poles capable of meeting the aforesaid stringent switching requirements and which exceed the capabilities of other known switching means.

In particular the laser beam switching arrangement of the present invention has an extrememly low inductance ($10^{-10}$ henries) and its multiple poles are capable of being highly synchronized, i.e., within $10^{-9}$ seconds, independent of the number of poles. This low inductance switch feature coupled with the low impedance inherent in coaxial transmission line structure permits the generation of the beformentioned desired extremely high voltage fast-rise-time short-duration pulses. In the instant pulse generator, as in all pulse generators, the pulse duration cannot be less than the pulse rise time. Otherwise, the pulse would never reach its maximum voltage. Although pulse width is determined primarily by the structural length of coaxial cylinders, rise time limitations of prior art devices have resulted in the inability to generate the narrow width high voltage pulses attainable with the pulse generator of the present invention. With the low inductance switch and the low characteristic impedance structure of the present invention, high-power, short-duration pulses are generated easily. The maximum high voltage output of this pulse generator theoretically is unlimited and can be increased merely by increasing the number of conducting cylinders. With the highly synchronized switch poles, there is a high degree of time coincidence of the pulses formed in the individual stages and hence no extended rise time.

More particularly, FIGURE 4 schematically depicts a single contact pair embodiment of the laser beam switch. Therein, laser beam switch 61 includes a conventional laser beam source 62 which generates a pulsed beam 64 of coherent, monochromatic light, hereinafter called a "laser beam." Beam 64 is directed by light conducting means 65, e.g., optical pipe, unrestricted air path, etc., to light focusing means 66. Focusing means 66, a converging lens in this case, then focuses beam 64 at focal point 67. The switch proper includes an insulator 68 located at focal point 67. This insulator 68, which may be any dielectric, for example polyethylene, is sandwiched between a pair of conducting plates 69 and 71 serving as the two contacts of switch 61. Power source 72 connects to load 73 through plates 69 and 71.

In operation, the focused laser beam 64 generates intense heat at focal point 67. Although the process is not fully understood, it is believed that this intense heat thermally decomposes or otherwise breaks down insulator 68 by a puncture and/or ionization process forming a highly conductive path between plates 69 and 71, whereby, the switch 63 is closed and power source 72 delivers current across the breakdown region to load 73. In the ionization process, when the heat ionizes the insulation, the resulting charged particles form a highly conductive path between the two plates of the switch thereby closing the switch. In the rupture process, the energy from the focused laser beam decomposes the insulation thereby substantially reducing its dielectric strength. Once this dielectric strength is reduced, the electric field established by a high voltage from power source 72 residing across the two plates can initiate a gaseous breakdown between the plates, thereby effectuating a switch closure. This laser beam switch can have an inductance as low as the order of $10^{-10}$ henries. This is approximately three or four orders of magnitude less inductance than available in prior art switches, e.g., spark gaps.

Note, that there are commercially available laser beam sources called "Giant Lasers" which have ample energy to effectively break down the switch insulation 68.

Highly successful results have been obtained by delivering a 5 nanosecond laser beam pulse of one-tenth joule energy to a focal spot 5 mils in diameter on a 50 mil polyethylene insulator. Practice indicates that any insulation would be suitable here, e.g., a dielectric oil, glass, ceramic, and the many plastic insulators. The only requirement is that the concentrated heat of the focused beam be sufficiently intense to vaporize the insulator.

There are commercially available laser beam sources, i.e., "Giant Lasers" which can deliver from one-tenth to one joule of energy within 5 nanoseconds to effectively break down the switch insulation 68. It has been found that those laser beam sources manufactured by Korad Corporation and by Spectra-Physics, Inc., work well in the switch herein described.

At this point it should be noted the new pulse generator of the present invention is not solely dependent on the laser beam switch for its opertion. For example, where the pulse rise time requirements are not critical, conventional multipole switches, e.g., a plurality of simultaneously operated thyratron, spark gap and other switches, may be used to initiate the voltage-removing step function wave.

FIGURE 5 schematically depicts a multipole version of the laser beam switch which, in addition to having the low inductance feature, is capable of contact closing time synchronization approaching one nanosecond or less. As illustrated therein a pair of terminal contacts 89 and 90 are disposed on opposite sides of a sheet of dielectric 88 to provide each pair of insulated poles of said switch. To provide for the substantially simultaneous closing of said contact pairs which provides the necessary highly synchronized switching function, a series of laser beam sources 81 are triggered simultaneously by conventional switching means to generate a plurality of laser beams 82. One illustration of an appropriate switching means is a Kerr Cell 83 interposed between each laser beam source 81 and optical conducting means 84. These Kerr Cells may be triggered simultaneously by connecting them in parallel to a conventional hydrogen thyratron trigger circuit 85. The multiple laser beams 81 travel along light conducting means 84 to a plurality of focusing means 86 and are converged thereby to focal points 87. The dielectric portion of each switch section is disposed at a focal point 87 whereby the dielectric is decomposed in each simultaneously, thereby closing the switch contacts as previously described in conjunction with FIGURE 4. By maintaining substantially equal optical lengths between each laser beam source 82 and its associated focal point 86, the contacts will close synchronously within 2 nanoseconds. Note that the only links between the various switch poles are the light conducting means 84 which easily can be made of excellent electrical insulating material such as glass. Hence, the poles easily are isolated from each other to withstand very high voltages. Alternative to using a series of laser beam sources, a single laser beam source may be combined with a beam splitter to provide the several beams.

To further elaborate on the simultaneous switching of the laser beam sources, e.g., ruby laser, it has been found that those Kerr Cells manufactured by Electro-Optical Corporation work well with the above-mentioned one-tenth joule energy, and above, laser beams. A hydrogen thyratron serves well to trigger these Kerr Cells. These Kerr Cells are connected in parallel, one Kerr Cell being used with each laser beam source. With this arrangement it is possible to simultaneously release the energy in all laser beam sources within the above-specified 2 nanosecond time spread.

FIGURE 6 pictorially sets forth structural details of one embodiment of the switch of FIGURE 4 adapted for use with the device of FIGURE 1 wherein spaced apart angled copper plates 91 and 92, are electrically conductively attached to shell portion 93, extend between copper shell 93 and polyethylene insulator 94, which sits adjacent copper shell portion 96. Shell portions 93 and 96 can be provided as extensions of shells 13 and 14, of FIG. 1 to provide integral construction. Glass rod light pipe 97 enters the space between shell portions 93 and 96, penetrates plate 91 and terminates adjacent prism 98. Converging lens 99 is disposed to receive a laser beam from prism 98 and direct a converged beam between plates 91 and 92 to a focal point situated within insulator 94.

In operation, a laser beam travels along glass rod 97 to prism 98 where it is deflected 90° towards lens 99. Lens 99 focuses this beam to a focal point within insulator 94 causing the insulation to break down and thereby closing the switch contact as previously described in conjunction with FIGURE 4.

The combination of prism 98 and lens 99 could be replaced by a parabolic mirror or, by a prism having a lens focusing surface, or prism 98 alone could be replaced by a flat mirror.

FIGURE 7 illustrates one manner in which the laser beam switch may be incorporated with or connected to the various conducting shell pairs of a modified FIGURE 2 embodiment. Only one laser beam source is shown.

In the figure, a pair of conducting tabs 101 and 102 extend from each of conducting shells 103 and 104, which may be shell pairs (33–34) (35–36) (37–38) of FIGURE 2, respectively, to be shorted together as was illustrated in FIGURE 2. These tabs hermetically penetrate into a dielectric-oil filled glass chamber 106. Laser beam source 107 is disposed outside chamber 106 so as to direct a laser beam into chamber 106. Converging prism 108 having a converging surface facing innermost tab 102 is disposed to have its focus point lie between tabs 102 and 101. A glass rod light conducting means 109 extends between prism 108 and the surface of chamber 106 which is facing laser beam source 107.

In operation, a laser beam from source 107 penetrates the glass wall of chamber 106, travels along rod 109, and is deflected and converged by converging prism 108 through a hole in tab 102 to its focal point. As previously described in conjunction with FIGURE 4, the heat generated at this focal point causes the dielectric oil to break down in the region between tabs 101 and 102. This breakdown effectively short circuits tabs 101 and 102 together.

With this oil immersed switch arrangement, the insulation in the switch is self-healing allowing repetitive operation without the necessity of replacing the insulation.

In a multiple stage pulse generator as depicted in FIGURE 2, the tab pairs of FIGURE 7 associated with each stage can be disposed angularly about the end of the generator such that the light conducting rods and the prisms will not interfere spacewise with each other.

*Example*

Constructional dimensions of a practical embodiment of the device of the present invention, which is similar to the structure shown in FIGURE 2, has the following dimensions and characteristics:

| | |
|---|---|
| Diameter of inner cylinder inches | 8 |
| Composition of inner cylinder | Brass |
| Thickness of conducting shells inch | 0.001 |
| Composition of conducting shells | Copper |
| Composition of insulating sheet between conducting shells | Polyethylene |
| Thickness of polyethylene insulator inch | 0.05 |
| Spacing between conducting shells inch | 0.05 |
| Number of stages | 20 |
| Number of conducting shells | 40 |
| Outer diameter of pulse generator inches | 12 |
| Length of conducting shells meters | 3 |

The above-described structure has an output characteristic impedance of approximately 16 ohms between the outermost and innermost conductors. When charged by a 100,000 volt power supply and connected to a matching load, this pulse generator can deliver a two million volt pulse for a duration of 30 nanoseconds at 125,000 amperes. An interesting design feature is the fact that the pulse duration, which is equal to two transit times, is a function only of the velocity of light in the insulator and the length of the structure and is independent of other geometric dimensions.

At this point it may be well to restate the fact that the highest performance characteristics of this pulse generator, i.e., fast rise time, short duration pulse, etc., depends on the existence and use of the heretofore unavailable switching characteristics of the laser beam switch of the present invention.

This invention should be construed liberally, and it will be understood that various changes and modifications may be made without departing from the spirit and scope of the invention. An example of one modification would be the use of a series of flat plates in the pulse generator instead of the coaxial cylinders. Furthermore, it should be understood that the field reversal generator can operate using switches other than the laser beam switch although maximum performance has been obtained using this particular switch. Also, the laser beam switch can be used in many applications other than with the field reversal generator. Furthermore, it is possible to close the various poles of the generator switch at spaced intervals to generate various staircase type waveforms. Also, by connecting some of the switch poles across even numbered insulation regions and connecting other poles across odd numbered insulation regions, and then closing these various poles at spaced intervals, many different waveforms can be obtained.

These and other modifications will be obvious to those skilled in the art and it is intended to cover all such as come within the scope of the appended claims.

What is claimed is:

1. In an electrical pulse generator, the combination comprising:
   (a) at least three coaxially nested spaced-apart, substantially coextensive conducting cylinders, numbered from 1 to N, where 1 is the innermost nested cylinder, and N is the outermost, said cylinders defining therebetween transmission lines;
   (b) insulation means interspersed between said cylinders;
   (c) means adapted to impose a voltage between the odd numbered cylinders and the even numbered cylinders;
   (d) a multiplicity of high impedance means, one high impedance means individually electrically interposed each cylinder and said voltage means;
   (e) switching means to short circuit at a first end of said cylinders each odd numbered line cylinder exclusively to only one of the adjacent even-numbered cylinders, said switching means comprising:
       (1) at least one light-focusing means associated with each odd numbered cylinder to be shorted, said focusing means disposed to have its focal point in the insulating region between said odd numbered cylinder and said adjacent cylinder at the first end of said cylinders;
       (2) a triggered coherent light beam source productive of at least one such coherent light beam for each focusing means; and
       (3) at least one coherent light conducting means associated with each focusing means, each conducting means disposed to conduct a coherent light beam from said beam source to said focusing means, and
   (f) terminal means to connect a load between the innermost and the outermost cylinders at the second end of said cylinders.

2. A pulse generator as recited in claim 1 wherein said high impedance means is a resistor whose resistance is at least two orders of magnitude greater than the characteristic impedance of the transmission line formed by the outermost and the innermost of said cylinders.

3. A pulse generator as recited in claim 1 wherein said light focusing means is a convex lens, and said light conducting means is a rod of light conductive material.

4. A pulse generator as recited in claim 1 wherein said light beam source comprises at least one laser beam generator associated with each focusing means and with each beam generator productive of at least a one-tenth joule laser beam pulse within five nanoseconds, each laser beam generator having an associated Kerr Cell appropriate to release said laser beam pulse within one nanosecond, said Kerr Cells electrically connected in parallel to a hydrogen thyration circuit arranged to simultaneously trigger said Kerr Cells.

5. In an electrical pulse generator, the combination comprising:
   (a) at least three coaxially nested spaced-apart, substantially coextensive-conducting cylinders defining transmission lines therebteween, said nested cylinders designated consecutively in coaxial disposed order by numbers 1 through N, where N represents the total number of cylinders and 1 is the innermost nested cylinder, N the outermost;
   (b) insulation means interspersed between said cylinders;
   (c) voltage means adapted to impose a voltage between the odd numbered cylinders and the even numbered line cylinders;
   (d) a multiplicity of high impedance means, one high impedance means individually, electrically interposed each cylinder and said voltage means;
   (e) switching means to short circuit at a first end of said cylinders each odd numbered cylinder exclusively to only one of its adjacent cylinders, said switching means comprising:
       (1) at least one light focusing means associated with each odd numbered cylinder to be shorted, said focusing means disposed to have its focal point in the insulating region between said odd numbered cylinder and said adjacent cylinder at the first end of said cylinders;
       (2) a triggered coherent light beam source productive of at least one such coherent light beam for each focusing means; and
       (3) at least one coherent light-conducting means associated with each focusing means, each conducting means disposed to conduct a coherent light beam from said beam source to said focusing means; and
   (f) a coaxial impendance load having an outer and an inner terminal means, said inner terminal means being directly electrically connected to the innermost cylinder number 1, said outer terminal means being directly electrically connected to the outermost cylinder number N, said inner and outer connections being fashioned to present no transmission line discontinuities between said transmission line formed by said innermost and outermost cylinders and said impedance load.

6. A pulse generator as recited in claim 5 wherein said impedance load has a characteristic impedance approximately equal to the characteristic impedance of the outermost-innermost cylinder combination of said multiplicity of said transmission line.

7. A pulse generator as recited in claim 5 wherein said coaxial load is a field-emission-cathode X-ray tube having a cathode and an anode, the field-emission cathode of said tube is directly electrically connected to said innermost cylinder, the anode is directly electrically connected to said outermost cylinder, and said voltage means connected to impose a positive voltage on said innermost cylinder.

8. In a coaxial transmission line type pulse generator capable of generating a 2 million volt 30 nanosecond pulse, the combination comprising:
   (a) a solid brass cylinder 8 inches in diameter and 3 meters in length,
   (b) forty progressively larger cylindrical copper shells each having a wall thickness of 1 mil and a length of 3 meters coaxially disposed about and coextensive with said brass cylinder, each progressively larger cylindrical copper shells spaced 50 mils apart from its respective adjacent cylinders, said shells designated consecutively in coaxial disposed order by numbers 1 through 40, (c) forty tabs, each tab exclusively secured to and in electrical communication with only one of said cylindrical shells at a first end thereof, each tab secured to each odd numbered shell in exclusive facing relationship to only one of its adjacent tabs thereby defining tab pairs, the tab pairs being disposed at 18 degree intervals around said first end of said pulse generator, the tabs of each tab pair defining an aperature at least 20 mils in diameter, (d) forty progressively larger diameter polyethylene cylindrical shells having a 50 mil wall thickness and more than a three meter length, coaxially interposed said cylinder and cylindrical shells to extend beyond the end limits of said brass cylinders, and polyethylene shells spaced 1 mil apart, (e) 20 polyethylene tabs, each polyethylene tab exclusively sandwiched in a region defined by said tabs of each tab pair, (f) twenty laser beam sources, each source productive of a one-tenth joule, less than five nanosecond laser beam pulse, each source including an associated Kerr Cell shutter appropriate to release said laser beam pulse within one nanosecond, said twenty Kerr Cells being electrically connected in parallel to a hydrogen thyratron trigger circuit arranged to simultaneously trigger said Kerr Cells, (g) twenty light conducting glass rods, each glass rod axially aligned exclusively along the path of the light beam generated by only one laser beam source, (h) twenty focusing lenses, each focusing lens exclusively associated with only one tab pair, each lens exclusively disposed to receive the light beam generated by only one of said laser beam sources and convergingly direct said beam through said aperture in the respective tab pair to approximately a 5 mil spot on the exposed surface of said polyethylene tab, (i) twenty light deflecting prisms, each prism exclusively disposed to receive the light beam generated by only one of said laser beam sources and transmitted by its associated glass rod and direct said beam to impinge said lens disposed in the path of said light beam, (j) high impedance terminal means connected to said brass cylinder and to said copper shells whereby a high voltage may be selectively impressed on said shells and on said cylinder, and (k) terminal means to connect an electrical impedance load between the outermost copper shell and the brass cylinder.

References Cited

UNITED STATES PATENTS

| | | | |
|---|---|---|---|
| 2,676,309 | 4/1954 | Armstrong | 333—84 |
| 2,769,148 | 10/1956 | Clogston | 333—84 |
| 3,200,697 | 8/1965 | Goubau | 331—94.5 X |
| 3,214,563 | 10/1965 | Ford | 331—94.5 X |
| 3,256,439 | 6/1966 | Dyke et al. | 250—98 |
| 3,295,011 | 12/1966 | Barbini | 315—149 |
| 3,366,799 | 1/1968 | Fitch | 307—110 |

WILLIAM F. LINDQUIST, *Primary Examiner.*

U.S. Cl. X.R.

250—102; 315—149; 328—67; 331—94.5